(12) United States Patent
Su

(10) Patent No.: US 7,647,442 B2
(45) Date of Patent: Jan. 12, 2010

(54) SERIES-CONNECTED CONTROL SYSTEM

(76) Inventor: Keng-Kuei Su, 7F-2, No. 286-8, Hsin-Ya Road, Chien-Chen District, Kaohsiung City (TW)

( * ) Notice: Subject to any disclaimer, the term of this patent is extended or adjusted under 35 U.S.C. 154(b) by 252 days.

(21) Appl. No.: 11/751,810

(22) Filed: May 22, 2007

(65) Prior Publication Data

US 2008/0294821 A1  Nov. 27, 2008

(51) Int. Cl.
*G06F 13/12* (2006.01)
*G06G 3/00* (2006.01)

(52) U.S. Cl. ........................................ 710/110; 710/12

(58) Field of Classification Search .................. 710/105, 710/106, 110, 12, 31
See application file for complete search history.

(56) References Cited

U.S. PATENT DOCUMENTS

| | | | |
|---|---|---|---|
| 5,610,749 A * | 3/1997 | Mizoguchi et al. .......... 398/166 |
| 5,923,643 A * | 7/1999 | Higgins et al. .............. 370/218 |
| 6,199,174 B1 * | 3/2001 | Norizuki et al. ................ 714/4 |
| 6,557,062 B1 * | 4/2003 | Shaler et al. ................ 710/110 |
| 6,816,933 B1 * | 11/2004 | Andreas ...................... 710/110 |
| 7,177,965 B2 * | 2/2007 | Joshi et al. ................... 710/110 |
| 7,366,815 B2 * | 4/2008 | Kadowaki .................... 710/305 |
| 7,386,638 B2 * | 6/2008 | Voth et al. ..................... 710/10 |
| 7,391,788 B2 * | 6/2008 | Zhang et al. ................. 370/438 |
| 7,430,626 B2 * | 9/2008 | Hedin .......................... 710/116 |
| 2006/0129722 A1 * | 6/2006 | Campbell .................... 710/106 |
| 2008/0152024 A1 * | 6/2008 | Takeuchi ..................... 375/257 |
| 2008/0276020 A1 * | 11/2008 | Ching et al. ................. 710/106 |

* cited by examiner

*Primary Examiner*—Mark Rinehart
*Assistant Examiner*—Trisha Vu
(74) *Attorney, Agent, or Firm*—Banner & Witcoff, Ltd.

(57) ABSTRACT

A control system includes a host device and a string of slave devices coupled in series. The host device includes a first transmission unit operable to transmit an encoded control signal provided by a first processing module, and to receive an encoded feedback signal for subsequent decoding by the first processing module. Each of the slave devices includes: a driven member responsive to a driving signal for generating an event; a driving unit operable to provide the driving signal; a detection unit generating an initial feedback signal based on the event; a second processing module capable of decoding the encoded control signal so as to drive the driving unit when an address code in the encoded control signal corresponds to the slave device, and of generating the encoded feedback signal; and a second transmission unit operable to receive the encoded control signal, and to transmit the encoded feedback signal.

12 Claims, 8 Drawing Sheets

SERIES-CONNECTED CONTROL SYSTEM

BACKGROUND OF THE INVENTION

1. Field of the Invention

The invention relates to a control system, more particularly to a series-connected control system that is provided with a feedback mechanism.

2. Description of the Related Art

As shown in FIG. 1, a conventional control system includes a host device 1, and a plurality of slave devices 10, 12, 14, 16 connected to the host device 1 and responsive to a control signal provided by the host device 1. However, since individual wiring is required to connect the slave devices 10, 12, 14, 16 to the host device 1, it is necessary for the host device 1 to be provided with a plurality of connecting ports corresponding in number to the slave devices 10, 12, 14, 16. Consequently, wiring of the conventional control system is complicated and wiring cost incurred is relatively high, especially when the number of slave devices included in the conventional control system is large.

In addition, in the conventional control system, a target one of the slave devices 10, 12, 14, 16 (hereinafter referred to as the target slave device) transmits an acknowledgement signal to the host device 1 upon receipt of the control signal provided by the host device 1 and corresponding to the target slave device. However, since the acknowledgement signal is transmitted upon receipt of the control signal and prior to the actual operation of the target slave device executed according to the control signal, the host device 1 is only informed of the completion of the transmission of the control signal, and is not informed of the progress/status of the operation of the target slave device.

SUMMARY OF THE INVENTION

Therefore, the object of the present invention is to provide a series-connected control system that can reduce wiring requirements to a minimum, thereby reducing wiring costs.

Another object of the present invention is to provide a control system that is provided with a feedback mechanism.

According to the present invention, there is provided a series-connected control system that includes a host device, and a string of slave devices coupled in series to the host device and to each other.

The host device includes a first processing module and a first transmission unit. The first processing module is capable of providing an encoded control signal that includes an address code, and of decoding an encoded feedback signal. The first transmission unit is coupled electrically to the first processing module, and is operable in a host transmitting mode, where the first transmission unit transmits the encoded control signal provided by the first processing module, and a host receiving mode, where the first transmission unit receives the encoded feedback signal for subsequent decoding by the first processing module.

Each of the slave devices includes a driven member, a driving unit, a detection unit, a second processing module, and a second transmission unit. The driven member is responsive to a driving signal for generating an event. The driving unit is coupled electrically to the driven member, and is operable to provide the driving signal to the driven member. The detection unit is coupled electrically to the driven member, and generates an initial feedback signal based on the event generated by the driven member. The second processing module is coupled electrically to the driving unit, and is capable of decoding the encoded control signal such that the second processing module drives the driving unit to provide the driving signal when the address code in the encoded control signal corresponds to the slave device. The second processing module is further coupled electrically to the detection unit so as to receive the initial feedback signal from the detection unit, and is capable of generating the encoded feedback signal from the initial feedback signal. The second transmission unit is coupled electrically to the second processing module, and is operable in a slave receiving mode, where the second transmission unit receives the encoded control signal and provides the encoded control signal to the second processing module for subsequent decoding thereby, and a slave transmitting mode, where the second transmission unit transmits the encoded feedback signal generated by the second processing module.

The string of slave devices includes first and second endmost slave devices. The second transmission unit of the first endmost slave device is connected electrically between the first transmission unit of the host device and the second transmission unit of an adjacent one of the slave devices. The second transmission unit of the second endmost slave device is connected electrically between the first transmission unit of the host device and the second transmission unit of an adjacent one of the slave devices.

The first transmission unit of the host device initially operates in the host transmitting mode, and the second transmission units of all of the slave devices initially operate in the slave receiving mode, such that the second transmission units of all of the slave devices are able to receive the encoded control signal provided by the first processing module of the host device and transmitted by the first transmission unit.

The first transmission unit of the host device operates in the host receiving mode after transmitting the encoded control signal, and the second transmission unit of a target one of the slave devices corresponding to the address code in the encoded control signal subsequently operates in the slave transmitting mode for transmitting the encoded feedback signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
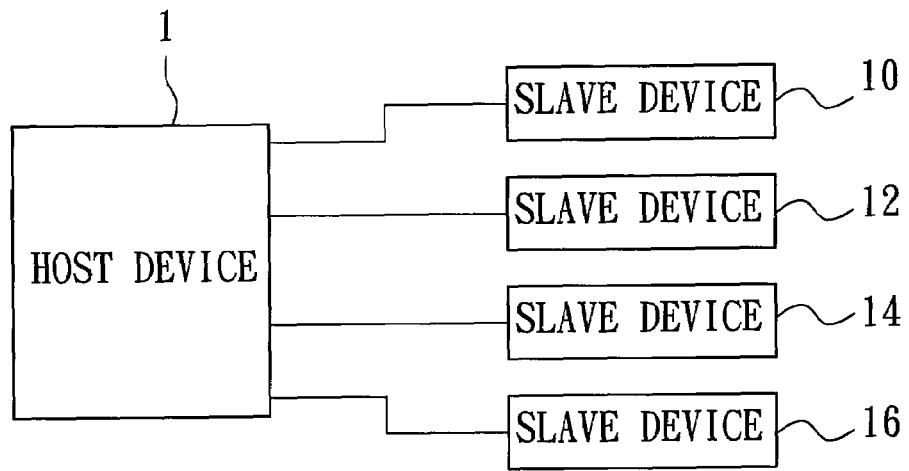
FIG. 1 is schematic block diagram of a conventional control system.

Before the present invention is described in greater detail, it should be noted that like elements are denoted by the same reference numerals throughout the disclosure.

Figure 2:
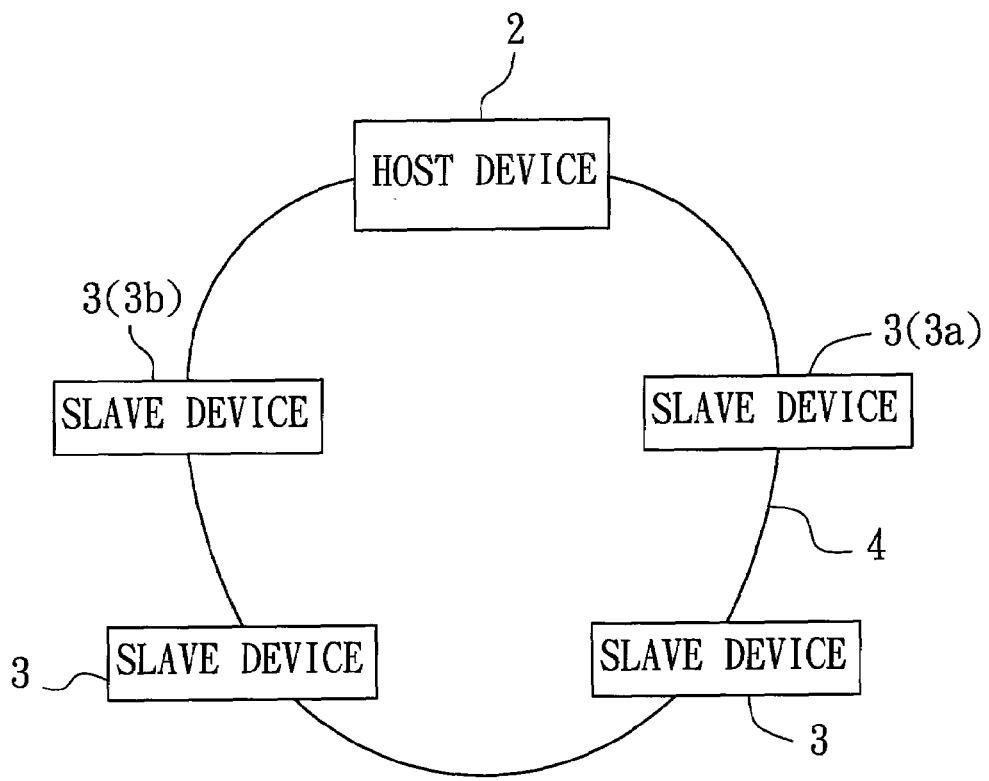
FIG. 2 is a schematic block diagram of the first preferred embodiment of a series-connected control system according to the present invention.

As shown in FIG. 2, the first preferred embodiment of a series-connected control system according to the present invention includes a host device 2, and a string of four slave devices 3 coupled in series to the host device 2 and to each other by a single-core cable 4. It should be noted herein that four slave devices 3 are included in this embodiment for illustrative purpose only, and should not be construed to limit the scope of the present invention. Any desired number of slave devices 3 can be included in other embodiments of the present invention to meet design requirements.

Figure 3:
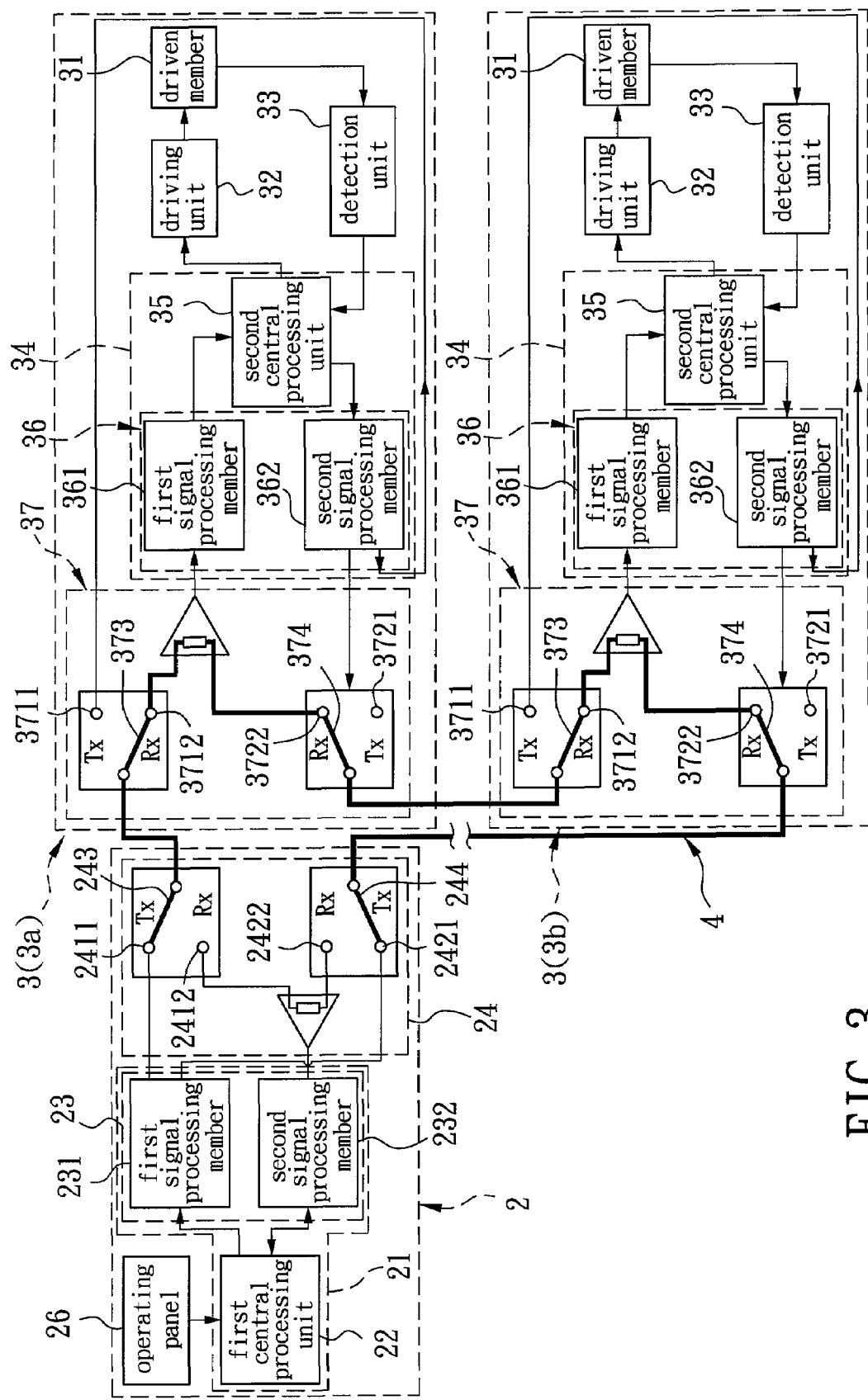
FIG. 3 is a circuit block diagram of the first preferred embodiment, illustrating a host device and two slave devices.
Figure 4:
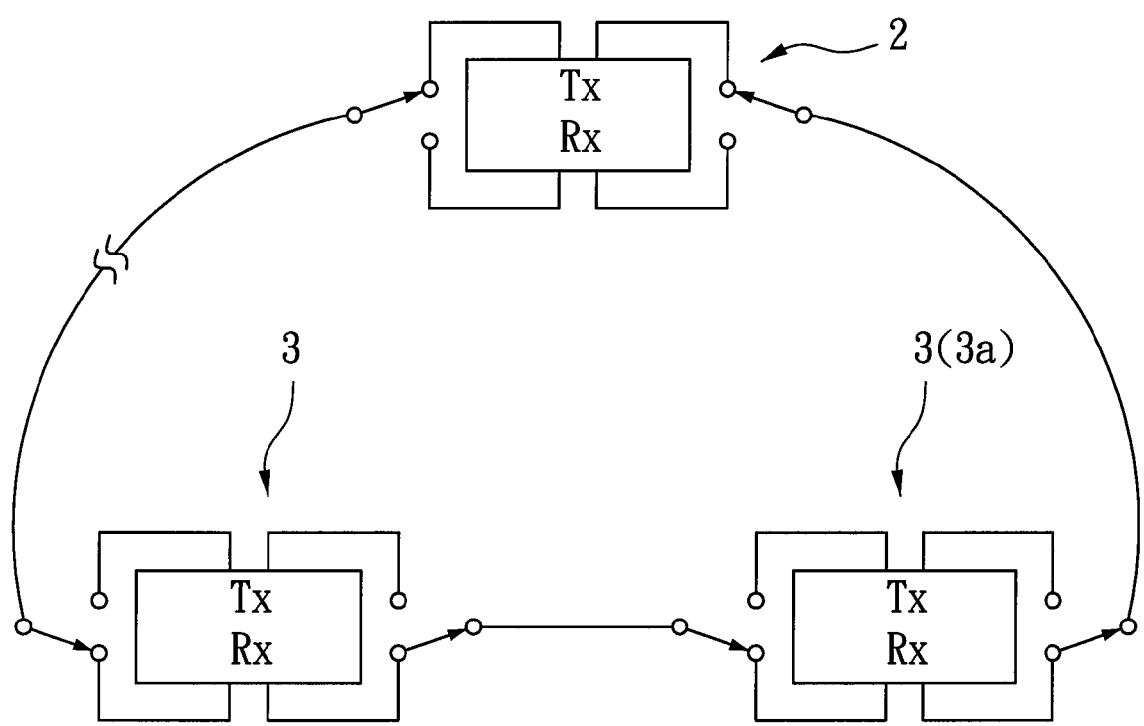
FIG. 4 is a simplified schematic diagram of the first preferred embodiment, illustrating default operation modes of the host device and the slave devices.

As shown in FIG. 3 and FIG. 4, the host device 2 includes a first processing module 21 and a first transmission unit 24. The first processing module 21 is capable of providing an encoded control signal that includes an address code, and of decoding an encoded feedback signal. The first transmission unit 24 is coupled electrically to the first processing module 21, and is operable in a host transmitting mode, where the first transmission unit 24 transmits the encoded control signal provided by the first processing module 21, and a host receiving mode, where the first transmission unit 24 receives the encoded feedback signal for subsequent decoding by the first processing module 21.

In this embodiment, the host device 2 further includes an operating panel 26 connected electrically to the first processing module 21. The first processing module 21 includes a first central processing unit 22 and a first signal processing unit 23. The first central processing unit 22 is capable of providing an initial encoded control signal, and is further capable of decoding a processed encoded feedback signal. The first signal processing unit 23 is connected electrically between the first central processing unit 22 and the first transmission unit 24, and is capable of processing the initial encoded control signal provided by the first central processing unit 22 into the encoded control signal to be transmitted by the first transmission unit 24 when the first transmission unit 24 operates in the host transmitting mode. The first signal processing unit 23 is further capable of processing the encoded feedback signal into the processed encoded feedback signal for subsequent decoding by the first central processing unit 22.

The first transmission unit 24 includes a first transmitting node 2411 and a first receiving node 2412. The first transmission unit 24 transmits the encoded control signal provided by the first processing module 21 via the first transmitting node 2411 when the first transmission unit 24 operates in the host transmitting mode, and receives the encoded feedback signal via the first receiving node 2412 when the first transmission unit 24 operates in the host receiving mode. In this embodiment, the first transmission unit 24 includes first and second pairs of the first transmitting node 2411, 2421 and the first receiving node 2412, 2422. The first transmission unit 24 further includes first and second switches 243, 244.

In this embodiment, the first signal processing unit 23 includes a first signal processing member 231 connected electrically between the first central processing unit 22 and the first transmitting nodes 2411, 2421 of the first and second pairs, and a second signal processing member 232 connected electrically between the first central processing unit 22 and the first receiving nodes 2412, 2422 of the first and second pairs. The first signal processing member 231 is capable of processing the initial encoded control signal provided by the first central processing unit 22 into the encoded control signal for subsequent transmission by the first transmission unit 24 when the first transmission unit 24 operates in the host transmitting mode. The second signal processing member 232 is capable of processing the encoded feedback signal into the processed encoded feedback signal for subsequent decoding by the first central processing unit 22.

As shown in FIG. 2, FIG. 3 and FIG. 4, the slave devices 3 are coupled in series to the host device 2 and to each other by the single-core cable 4 so as to form a ring-shaped closed loop. Note that only two of the slave devices 3 are illustrated in FIG. 3 and FIG. 4 for simplicity of explanation. Each of the slave devices 3 includes a driven member 31, a driving unit 32, a detection unit 33, a second processing module 34, and a second transmission unit 37. The driven member 31 is responsive to a driving signal for generating an event. The driving unit 32 is coupled electrically to the driven member 31, and is operable to provide the driving signal to the driven member 31. The detection unit 33 is coupled electrically to the driven member 31, and generates an initial feedback signal based on the event generated by the driven member 31. The second processing module 34 is coupled electrically to the driving unit 32, and is capable of decoding the encoded control signal such that the second processing module 34 drives the driving unit 32 to provide the driving signal when the address code in the encoded control signal corresponds to the slave device 3. The second processing module 34 is further coupled electrically to the detection unit 33 so as to receive the initial feedback signal from the detection unit 33, and is capable of generating the encoded feedback signal from the initial feedback signal. The second transmission unit 37 is coupled electrically to the second processing module 34, and is operable in a slave receiving mode, where the second transmission unit 37 receives the encoded control signal and provides the encoded control signal to the second processing module 34 for subsequent decoding thereby, and a slave transmitting mode, where the second transmission unit 37 transmits the encoded feedback signal generated by the second processing module 34.

In this embodiment, the second processing module 24 of each of the slave devices 3 includes a second central processing unit 35 and a second signal processing unit 36. The second central processing unit 35 is capable of providing an initial encoded feedback signal from the initial feedback signal, and is further capable of decoding a processed encoded control signal. The second signal processing unit 36 is connected electrically between the second central processing unit 35 and the second transmission unit 37, and is capable of processing the initial encoded feedback signal provided by the second central processing unit 35 into the encoded feedback signal to be transmitted by the second transmission unit 37 when the second transmission unit 37 operates in the slave transmitting mode. The second signal processing unit 36 is further capable of processing the encoded control signal into the processed encoded control signal for subsequent decoding by the second central processing unit 35.

The second transmission unit 37 of each of the slave devices 3 includes a second transmitting node 3711 and a second receiving node 3712. The second transmission unit 37 receives the encoded control signal via the second receiving node 3712 when the second transmission unit 37 operates in the slave receiving mode, and transmits the encoded feedback signal provided by the second processing module 34 via the second transmitting node 3711 when the second transmission unit 37 operates in the slave transmitting mode. In this embodiment, the second transmission unit 37 includes first and second pairs of the second transmitting node 3711, 3721 and the second receiving node 3712, 3722. The second transmission unit 37 further includes first and second switches 373, 374.

In this embodiment, the second signal processing unit 36 includes a first signal processing member 361 connected electrically between the second central processing unit 35 and the second receiving nodes 2712, 2722 of the first and second pairs, and a second signal processing member 362 connected electrically between the second central processing unit 35 and the second transmitting nodes 3711, 3721 of the first and second pairs. The first signal processing member 361 is capable of processing the encoded control signal into the processed encoded control signal for subsequent decoding by the second central processing unit 35. The second signal processing member 362 is capable of processing the initial encoded feedback signal provided by the second central processing unit 35 into the encoded feedback signal for subsequent transmission by the second transmission unit 37 when the second transmission unit 37 operates in the slave transmitting mode.

As shown in FIG. 2, the string of slave devices 3 includes first and second endmost slave devices 3a, 3b. Referring to FIG. 3 (note that the slave device 3 illustrated at the bottom of FIG. 3 assumes the role of the second endmost slave device 3b), the second transmission unit 37 of the first endmost slave device 3a is connected electrically between the first transmission unit 24 of the host device 2 and the second transmission unit 37 of an adjacent one of the slave devices 3. The second transmission unit 37 of the second endmost slave device 3b is connected electrically between the first transmission unit 24 of the host device 2 and the second transmission unit 37 of an adjacent one of the slave devices 3.

The first switch 243 of the first transmission unit 24 is operable to connect electrically the second transmission unit 37 of the first endmost slave device 3a to the first transmitting node 2411 of the first pair, and the second switch 244 of the first transmission unit 24 is operable to connect electrically the second transmission unit 37 of the second endmost slave device 3b to the first transmitting node 2421 of the second pair when the first transmission unit 24 operates in the host transmitting mode.

The first switch 243 of the first transmission unit 24 is further operable to connect electrically the second transmission unit 37 of the first endmost slave device 3a to the first receiving node 3712 of the first pair, and the second switch 244 of the first transmission unit 24 is further operable to connect electrically the second transmission unit 37 of the second endmost slave device 3b to the first receiving node 3722 of the second pair when the first transmission unit 37 operates in the host receiving mode.

The first switch 373 of the second transmission unit 37 of each slave device 3 is operable to establish connection between the first transmission unit 24 of the host device 2 and the second receiving node 3712 of the first pair, and the second switch 374 of the second transmission unit 37 of each slave device 3 is operable to establish connection between the first transmission unit 24 of the host device 2 and the second receiving node 3722 of the second pair when the second transmission unit 37 operates in the slave receiving mode.

The first switch 373 of the second transmission unit 37 of each slave device 3 is further operable to establish connection between the first transmission unit 24 of the host device 2 and the second transmitting node 3711 of the first pair, and the second switch 374 of the second transmission unit 37 of each slave device 3 is further operable to establish connection between the first transmission unit 24 of the host device 2 and the second transmitting node 3721 of the second pair when the second transmission unit 37 operates in the slave transmitting mode.

The operation of the series-connected control system according to the present invention will now be described hereinafter.

As shown in FIG. 3, the first transmission unit 24 of the host device 2 initially operates in the host transmitting mode, and the second transmission units 37 of all of the slave devices 3 initially operate in the slave receiving mode, where the first and second switches 243, 244 of the first transmission unit 24 and the first and second switches 373, 374 of the second transmission units 37 of all of the slave devices 3 cooperate to establish electrical connection between the first transmitting nodes 2411, 2421 of the first transmission unit 241 and the second receiving nodes 3712, 3722 of the second transmission units 37 of all of the slave devices 3. As a consequence, the second transmission units 37 of all of the slave devices 3 are able to receive the encoded control signal provided by the first processing module 24 of the host device 2 and transmitted by the first transmission unit 24.

When it is desired to control operation of a particular one of the slave devices 3 (also referred to as a target slave device 3') by the host device 2, a control command can be provided to the host device 2 via the operating panel 26, such that the first central processing unit 22 of the first processing module 20 generates an initial encoded control signal with an initial address code that corresponds to the target slave device 3'. Next, the initial encoded control signal is processed by the first processing member 231 of the first processing unit 23 into the encoded control signal. In this embodiment, the encoded control signal is a string of digital signals, including a start bit and an end bit. The processing conducted by the first processing member 231 can be filtering, amplifying, etc. Subsequently, the encoded control signal is transmitted by the first transmission unit 24 of the host device 2 to the second transmission unit 37 of all of the slave devices 3 via the first transmitting nodes 2411, 2421 and the second receiving nodes 3712, 3722 along the single-core cable 4.

Figure 5:
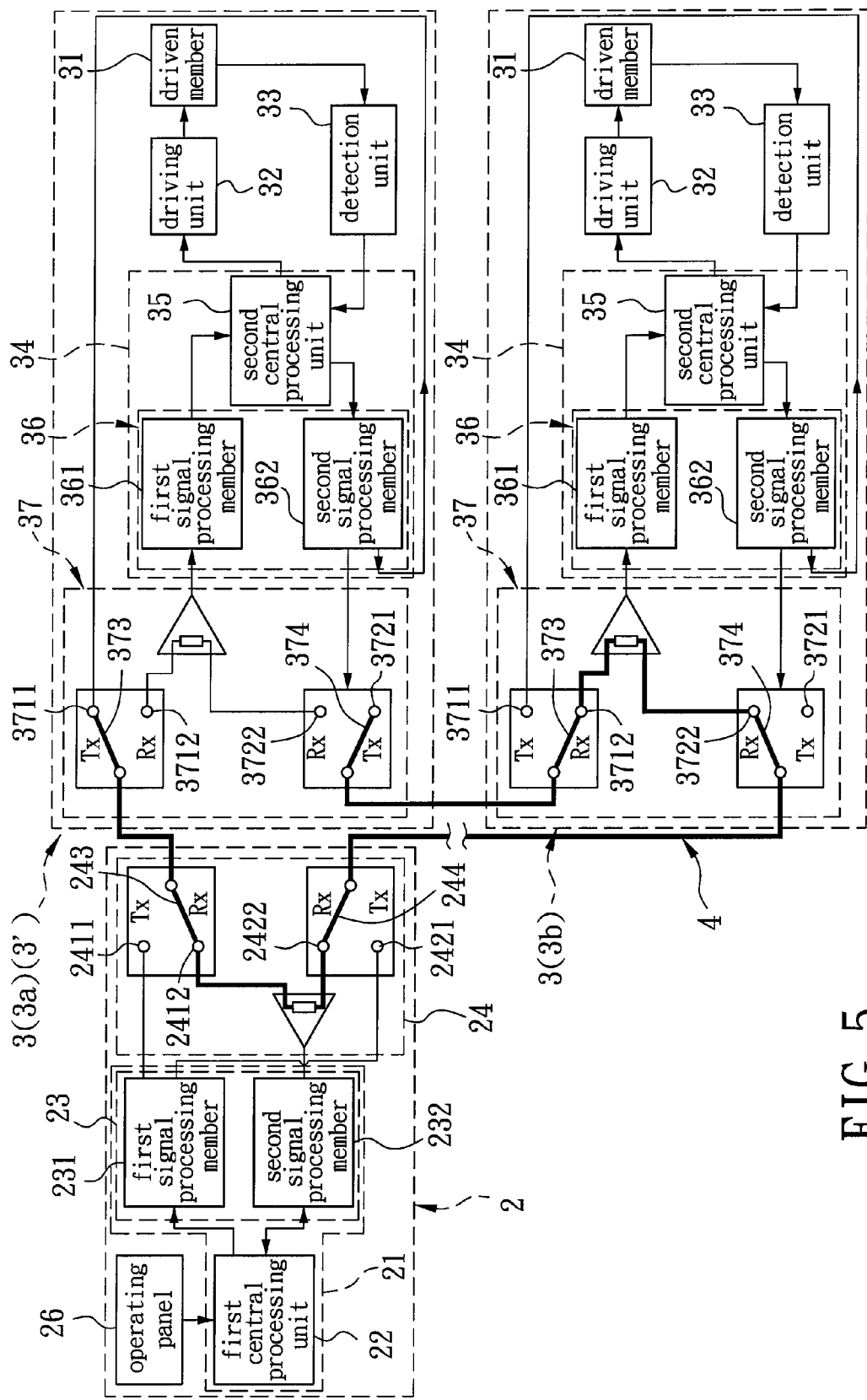
FIG. 5 is a circuit block diagram of the first preferred embodiment, illustrating an example where a first endmost slave device is a target slave device.
Figure 6:
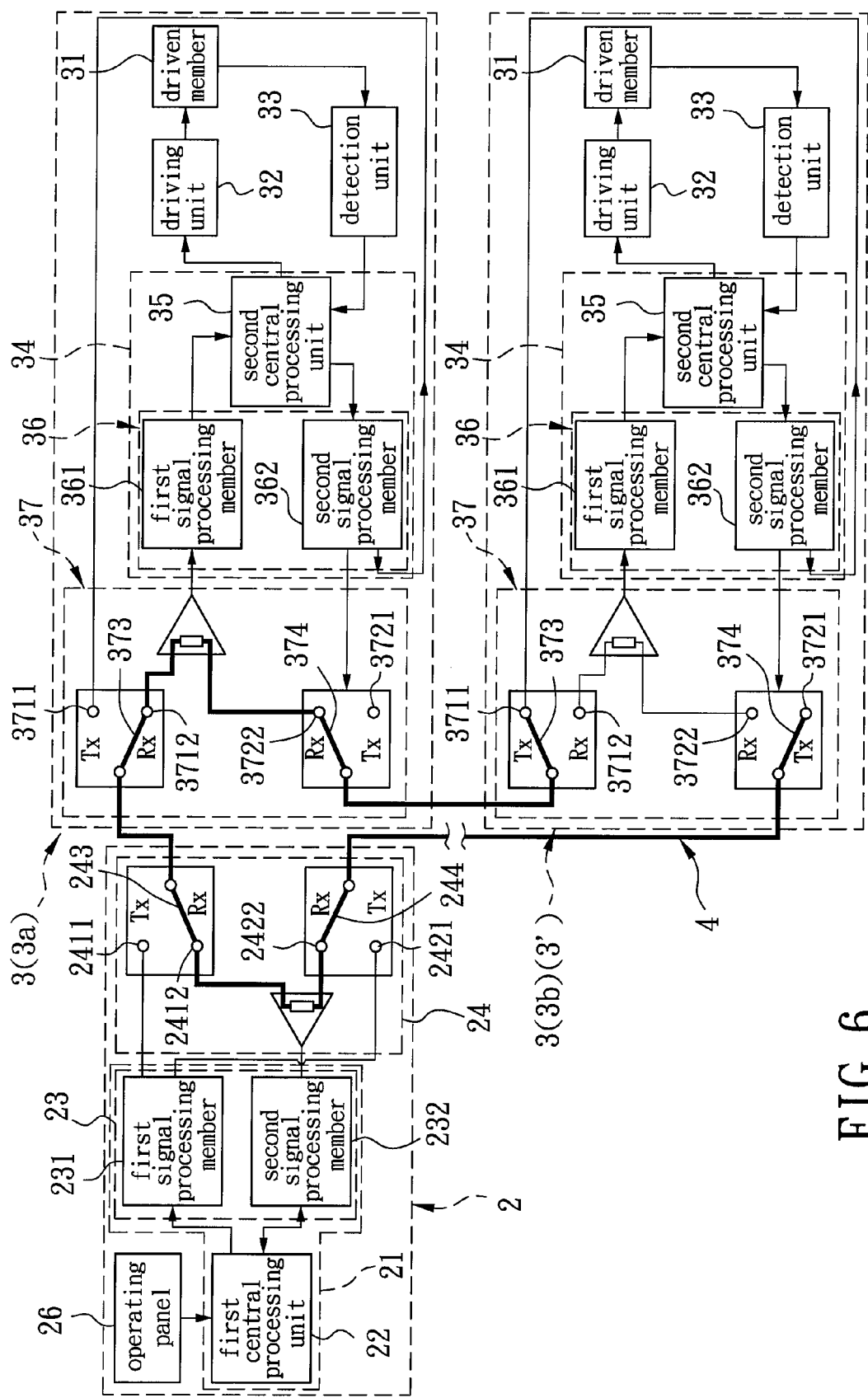
FIG. 6 is a circuit block diagram of the first preferred embodiment, illustrating an example where a second endmost slave device is the target slave device.

As shown in FIG. 5 and FIG. 6, after the end bit of the encoded control signal is transmitted, the first transmission unit 24 of the host device 2 is switched by the first central processing unit 22 to operate in the host receiving mode, where the first and second switches 243, 244 of the first transmission unit 24 connect electrically and respectively to the first receiving nodes 2412, 2422, such that the host device 2 is ready to receive an encoded feedback signal from the target slave device 3'.

FIG. 5 illustrates an example, where the first endmost slave device 3a is the target slave device 3', and FIG. 6 illustrates another example, where the second endmost slave device 3b is the target slave device 3'.

After the encoded control signal is received by the second transmission units 37 of all of the slave devices 3, the first signal processing member 361 of the second signal processing unit 36 of the second processing module 34 of each of the slave devices 3 processes the encoded control signal into a processed encoded control signal for subsequent decoding by the second central processing unit 35. After the second central processing unit 35 of each of the slave devices 3 decodes the processed encoded control signal, only the second central processing unit 35 of the target slave device 3' that corresponds to the address code in the encoded control signal proceeds to drive the driving unit 32 thereof to provide a driving signal to the driven member 31. The driven member 31 of the target slave device 3' responds to the driving signal by generating an event, such as lighting up a lamp or activating a motor. Upon detecting the occurrence of the event, the detection unit 33 of the target slave device 3' generates an initial feedback signal based on the event, which is subsequently received by the second central processing unit 35. The second central processing unit 35 provides an initial encoded feedback signal from the initial feedback signal received from the detection unit 33. The second signal processing member 362 of the second signal processing unit 36 then processes the initial encoded feedback signal into an encoded feedback signal. The second transmission unit 37 of the target slave device 3' is then switched by the second central processing unit 35 to operate in the slave transmitting mode, where the first and second switches 373, 374 connect respectively and electrically to the second transmitting nodes 3711, 3721, and transmits the encoded feedback signal.

At this time, since the first transmission unit 24 of the host device 2 operates in the host receiving mode, the encoded feedback signal is successfully received thereby via the first receiving nodes 2412, 2422.

After the encoded feedback signal is processed by the second signal processing member 232 of the first signal processing unit 23 into a processed encoded feedback signal, the first central processing unit 22 decodes the processed encoded feedback signal. At this time, the host device 2 acknowledges the operation of the target slave device 3'. It should be noted herein that the first and second switches 373, 374 of the target slave device 3' connect respectively and electrically to the second receiving nodes 3712, 3722 after transmitting the encoded feedback signal so as to once again operate the second transmission unit 37 back in the slave receiving mode, thereby preparing the target slave device 3' to receive another encoded control signal from the host device 2 during a next transmission.

Figure 7:
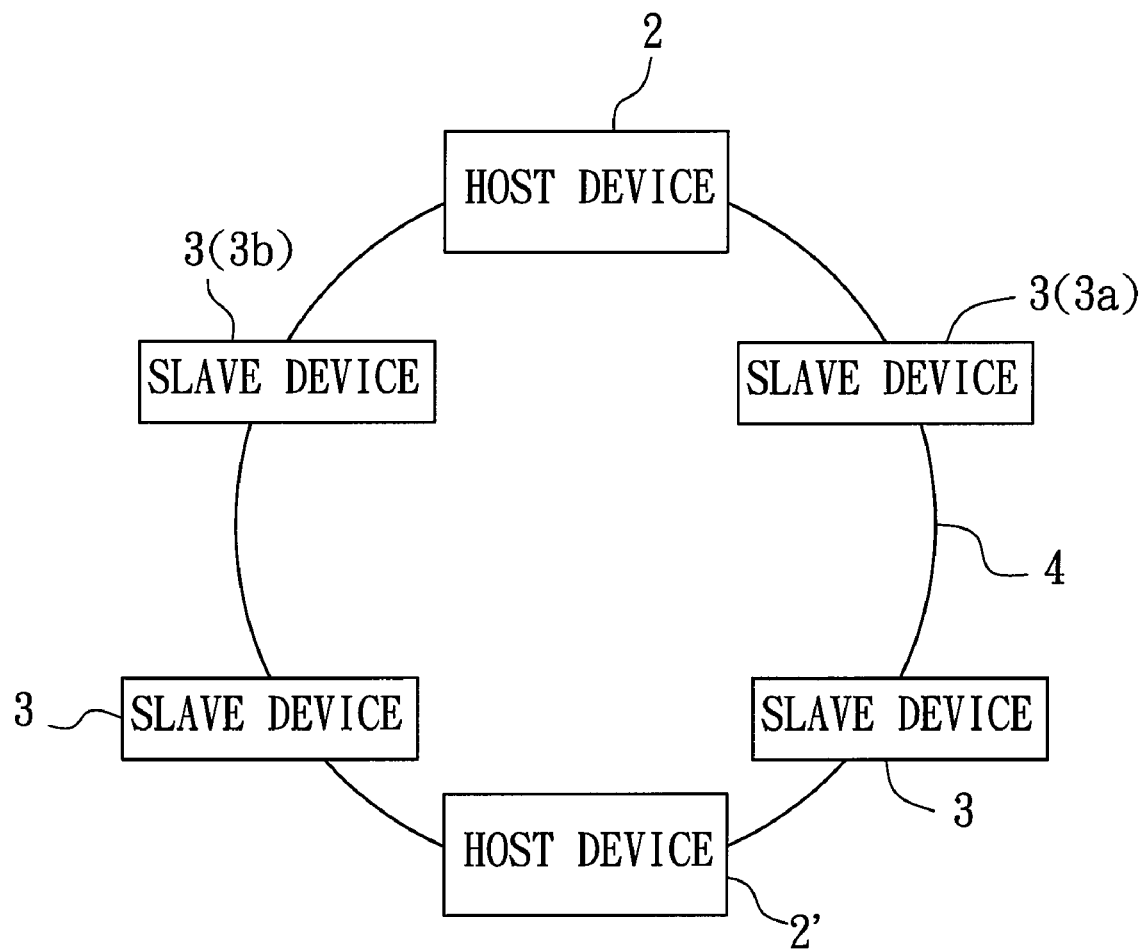
FIG. 7 is a schematic block diagram of the second preferred embodiment of a series-connected control system according to the present invention.
Figure 8:
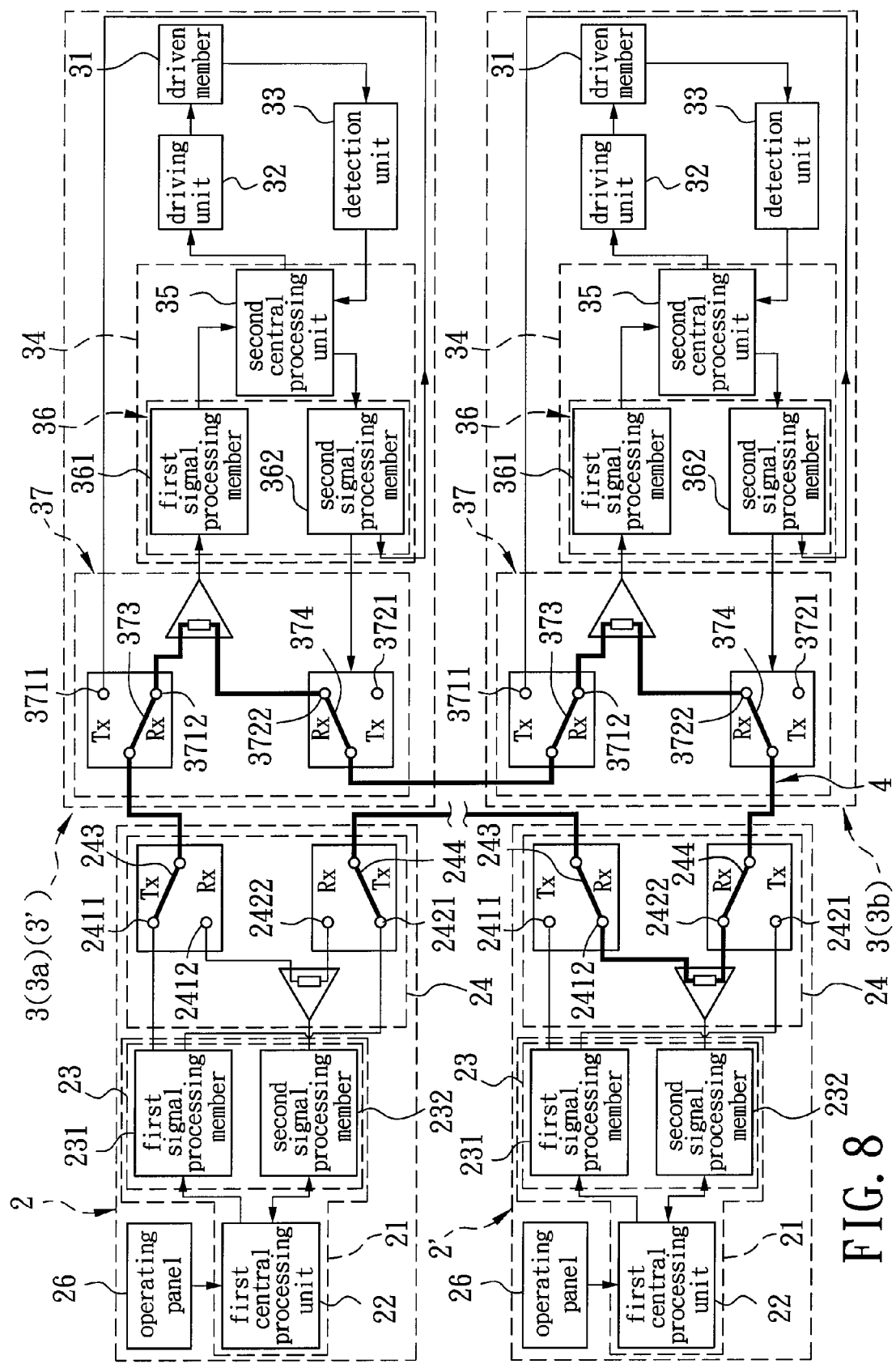
FIG. 8 is a circuit block diagram of the second preferred embodiment, illustrating two host devices and two slave devices.
Figure 9:
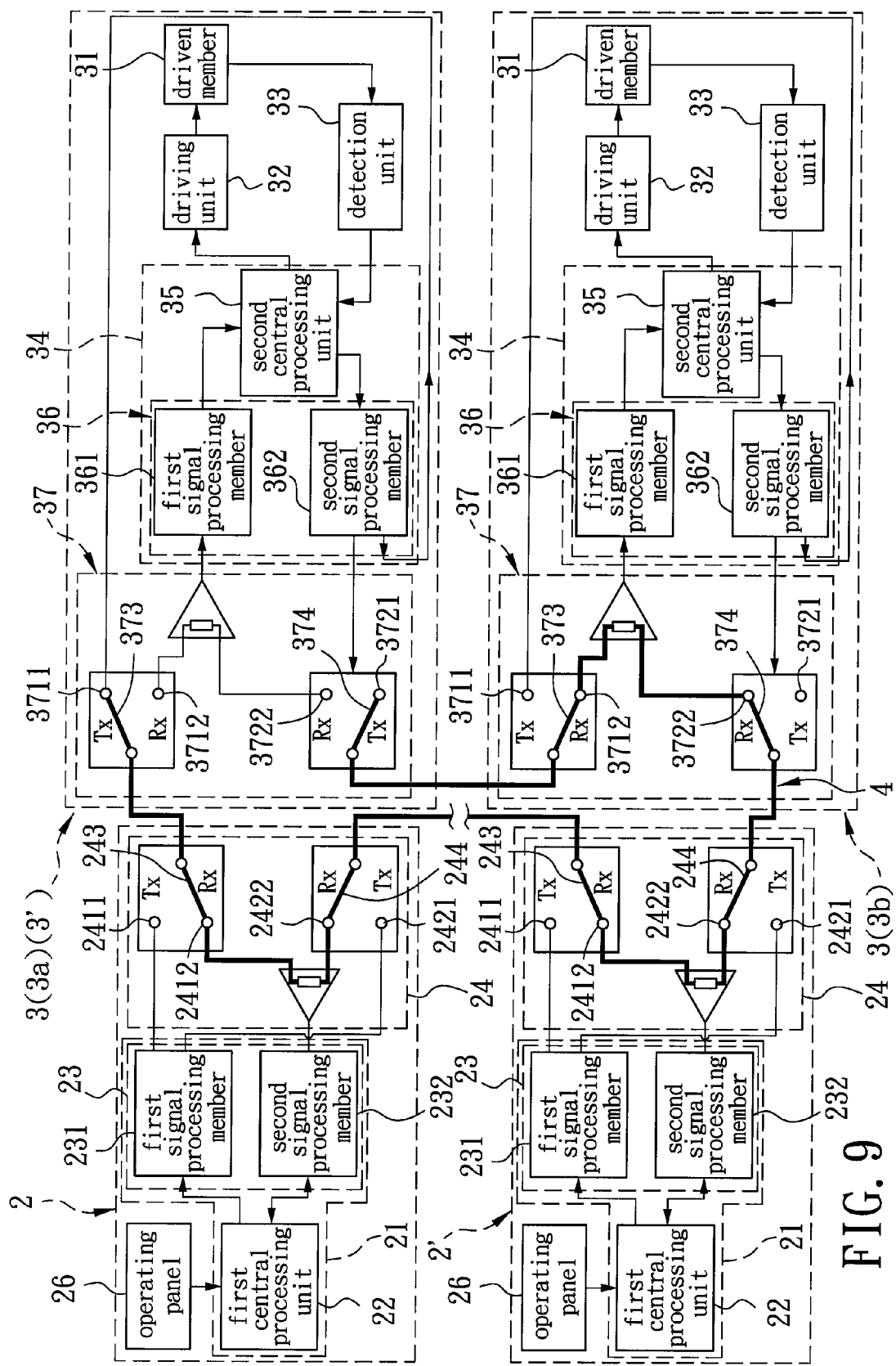
FIG. 9 is a circuit block diagram of the second preferred embodiment, illustrating path of the encoded feedback signal from one of the slave devices to the host devices.

As shown in FIG. 7, the second preferred embodiment of a series-connected control system according to the present invention differs from the first preferred embodiment in that the second preferred embodiment includes an additional host device 2' that is inserted into the string of slave devices 3. The host devices 2, 2' and the slave devices 3 of the second preferred embodiment are still coupled in series by the single-core cable 4, and still form the ring-shaped closed loop. Prior to controlling the slave devices 3, it is required for a user to send commands to the host devices 2, 2' through the control panels 26 thereof 2, 2' in order to set the initial operating modes of the host devices 2, 2', such that only one of the host devices 2, 2' operates in the host transmitting mode, while the other one of the host devices 2, 2' operates in the host receiving mode. As a result, the transmitting host device 2 or 2' can control the target slave device 3' by transmitting an encoded control signal thereto via the path established by the slave devices 3 and the non-transmitting host device 2 or 2'. FIG. 8 and FIG. 9 illustrate an example, where the host device 2 is the transmitting host device, and the first endmost slave device 3a is the target slave device 3'. Since operating principles of the second preferred embodiment are identical to those of the first preferred embodiment, further details of the same are omitted herein for the sake of brevity.

In sum, since the control system according to the present invention is series-connected, the wiring requirements and the wiring cost incurred are both reduced substantially. In addition, since the first transmission unit 24 of the host device 2 (2') is operable between the host transmitting mode and the host receiving mode, and since the second transmission unit 37 of each of the slave devices 3 is operable between the slave receiving mode and the slave transmitting mode, the encoded control signal and the encoded feedback signal can be respectively transmitted by the first and second transmission units 24, 37 at appropriate times, such that the host devices 2 (2') is informed of the actual operation of the target slave devices 3' through the feedback mechanism in the control system of this invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A series-connected control system, comprising:
   a host device that includes
      a first processing module capable of providing an encoded control signal which includes an address code, and of decoding an encoded feedback signal, and
      a first transmission unit coupled electrically to said first processing module, and operable in a host transmitting mode, where said first transmission unit transmits the encoded control signal provided by said first processing module, and a host receiving mode, where said first transmission unit receives the encoded feedback signal for subsequent decoding by said first processing module; and
   a string of slave devices that are coupled in series to said host device and to each other, each of said slave devices including
      a driven member responsive to a driving signal for generating an event,
      a driving unit coupled electrically to said driven member, and operable to provide the driving signal to said driven member,
      a detection unit coupled electrically to said driven member, and generating an initial feedback signal based on the event generated by said driven member,
      a second processing module coupled electrically to said driving unit, and capable of decoding the encoded control signal such that said second processing module drives said driving unit to provide the driving signal when the address code in the encoded control signal corresponds to said slave device, said second processing module being further coupled electrically to said detection unit so as to receive the initial feedback signal from said detection unit, and being capable of generating the encoded feedback signal from the initial feedback signal, and
      a second transmission unit coupled electrically to said second processing module, and operable in a slave receiving mode, where said second transmission unit receives the encoded control signal and provides the encoded control signal to said second processing module for subsequent decoding thereby, and a slave transmitting mode, where said second transmission unit transmits the encoded feedback signal generated by said second processing module;
   wherein said string of slave devices includes first and second endmost slave devices, said second transmission unit of said first endmost slave device being connected electrically between said first transmission unit of said host device and said second transmission unit of an adjacent one of said slave devices, said second transmission unit of said second endmost slave device being connected electrically between said first transmission unit of said host device and said second transmission unit of an adjacent one of said slave devices;

wherein said first transmission unit of said host device initially operates in the host transmitting mode, and said second transmission units of all of said slave devices initially operate in the slave receiving mode, such that said second transmission units of all of said slave devices are able to receive the encoded control signal provided by said first processing module of said host device and transmitted by said first transmission unit; and wherein said first transmission unit of said host device operates in the host receiving mode after transmitting the encoded control signal, and said second transmission unit of a target one of said slave devices corresponding to the address code in the encoded control signal subsequently operates in the slave transmitting mode for transmitting the encoded feedback signal.

2. The series-connected control system as claimed in claim 1, wherein said first processing module of said host device includes:

a first central processing unit capable of providing an initial encoded control signal, and of decoding a processed encoded feedback signal; and a first signal processing unit connected electrically between said first central processing unit and said first transmission unit, and capable of processing the initial encoded control signal provided by said first central processing unit into the encoded control signal to be transmitted by said first transmission unit when said first transmission unit operates in the host transmitting mode, and of processing the encoded feedback signal into the processed encoded feedback signal for subsequent decoding by said first central processing unit.

3. The series-connected control system as claimed in claim 1, wherein said second processing module of each of said slave devices includes:

a second central processing unit capable of providing an initial encoded feedback signal from the initial feedback signal, and of decoding a processed encoded control signal; and a second signal processing unit connected electrically between said second central processing unit and said second transmission unit, and capable of processing the initial encoded feedback signal provided by said second central processing unit into the encoded feedback signal to be transmitted by said second transmission unit when said second transmission unit operates in the slave transmitting mode, and of processing the encoded control signal into the processed encoded control signal for subsequent decoding by said second central processing unit.

4. The series-connected control system as claimed in claim 1, wherein said string of slave devices are coupled in series to said host device and to each other by a single-core cable so as to form a ring-shaped closed loop.

5. The series-connected control system as claimed in claim 1, wherein said first transmission unit of said host device includes a first transmitting node and a first receiving node, said first transmission unit transmitting the encoded control signal provided by said first processing module via said first transmitting node when said first transmission unit operates in the host transmitting mode, and receiving the encoded feedback signal via said first receiving node when said first transmission unit operates in the host receiving mode.

6. The series-connected control system as claimed in claim 5, wherein said first transmission unit of said host device includes first and second pairs of said first transmitting node and said first receiving node, said first transmission unit further including first and second switches;

said first switch of said first transmission unit being operable to connect electrically said second transmission unit of said first endmost slave device to said first transmitting node of said first pair, and said second switch of said first transmission unit being operable to connect electrically said second transmission unit of said second endmost slave device to said first transmitting node of said second pair when said first transmission unit operates in the host transmitting mode;

said first switch of said first transmission unit being further operable to connect electrically said second transmission unit of said first endmost slave device to said first receiving node of said first pair, and said second switch of said first transmission unit being further operable to connect electrically said second transmission unit of said second endmost slave device to said first receiving node of said second pair when said first transmission unit operates in the host receiving mode.

7. The series-connected control system as claimed in claim 6, wherein said first processing module of said host device includes:

a first central processing unit capable of providing an initial encoded control signal, and of decoding a processed encoded feedback signal;

a first signal processing member connected electrically between said first central processing unit and said first transmitting nodes of said first and second pairs, and capable of processing the initial encoded control signal provided by said first central processing unit into the encoded control signal for subsequent transmission by said first transmission unit when said first transmission unit operates in the host transmitting mode; and a second signal processing member connected electrically between said first central processing unit and said first receiving nodes of said first and second pairs, and capable of processing the encoded feedback signal into the processed encoded feedback signal for subsequent decoding by said first central processing unit.

8. The series-connected control system as claimed in claim 1, wherein said second transmission unit of each of said slave devices includes a second transmitting node and a second receiving node, said second transmission unit receiving the encoded control signal via said second receiving node when said second transmission unit operates in the slave receiving mode, and transmitting the encoded feedback signal provided by said second processing module via said second transmitting node when said second transmission unit operates in the slave transmitting mode.

9. The series-connected control system as claimed in claim 8, wherein said second transmission unit of each of said slave devices includes first and second pairs of said second transmitting node and said second receiving node, said second transmission unit further including first and second switches;

said first switch of said second transmission unit being operable to establish connection between said first transmission unit of said host device and said second receiving node of said first pair, and said second switch of said second transmission unit being operable to establish connection between said first transmission unit of said host device and said second receiving node of said second pair when said second transmission unit operates in the slave receiving mode;

said first switch of said second transmission unit being further operable to establish connection between said first transmission unit of said host device and said second transmitting node of said first pair, and said second switch of said second transmission unit being further operable to establish connection between said first transmission unit of said host device and said second transmitting node of said second pair when said second transmission unit operates in the slave transmitting mode.

10. The series-connected control system as claimed in claim 9, wherein said second processing module of each of said slave devices includes:
 a second central processing unit capable of providing an initial encoded feedback signal from the initial feedback signal, and of decoding a processed encoded control signal;
 a first signal processing member connected electrically between said second central processing unit and said second receiving nodes of said first and second pairs, and capable of processing the encoded control signal into the processed encoded control signal for subsequent decoding by said second central processing unit; and
 a second signal processing member connected electrically between said second central processing unit and said second transmitting nodes of said first and second pairs, and capable of processing the initial encoded feedback signal provided by said second central processing unit into the encoded feedback signal for subsequent transmission by said second transmission unit when said second transmission unit operates in the slave transmitting mode.

11. A host device comprising:
 a processing module that is capable of providing an encoded control signal which includes an address code, and of decoding an encoded feedback signal; and
 a transmission unit that is coupled electrically to said processing module, that is operable initially in a host transmitting mode, where said transmission unit is capable of transmitting the encoded control signal provided by said processing module, and that is further operable in a host receiving mode after transmitting the encoded control signal, where said transmission unit is capable of receiving an encoded feedback signal for signal for subsequent decoding by said processing module;
 wherein said transmission unit included a transmitting node and a receiving node, said transmission unit transmitting the encoded control signal provided by said processing module via said transmitting node when said transmission unit operates in the host transmitting mode, and receiving the encoded feedback signal via said receiving node when said transmission unit operates in the host receiving mode; wherein said transmission unit includes first and second pairs of said transmitting node and said receiving node, said transmission unit further including first and second switches;
 said first switch being operable to connect electrically to said transmitting node of said first pair, and said second switch being operable to connect electrically to said transmitting node of said second pair when said transmission unit operates in the host transmitting mode;
 said first switch being further operable to connect electrically to said receiving node of said first pair, and said second switch being further operable to connect electrically to said receiving node of said second pair when said transmission unit operates in the host receiving mode.

12. The host device as claimed in claim 11, wherein said processing module includes:
 a central processing unit capable of providing an initial encoded control signal, and of decoding a processed encoded feedback signal;
 a first signal processing member connected electrically between said central processing unit and said transmitting nodes of said first and second pairs, and capable of processing the initial encoded control signal provided by said central processing unit into the encoded control signal for subsequent transmission by said transmission unit when said transmission unit operates in the host transmitting mode; and
 a second signal processing member connected electrically between said central processing unit and said receiving nodes of said first and second pairs, and capable of processing the encoded feedback signal into the processed encoded feedback signal for subsequent decoding by said central processing unit.

* * * * *